(12) United States Patent
Shen et al.

(10) Patent No.: US 10,546,390 B2
(45) Date of Patent: *Jan. 28, 2020

(54) METHOD FOR CALIBRATING AN IMAGING DEVICE AND AN IMAGING DEVICE

(71) Applicant: SZ DJI TECHNOLOGY CO., LTD., Shenzhen (CN)

(72) Inventors: Yu Shen, Shenzhen (CN); Ang Liu, Shenzhen (CN); Ketan Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,772

(22) Filed: Jan. 17, 2019

(65) Prior Publication Data
US 2019/0156517 A1 May 23, 2019

Related U.S. Application Data

(63) Continuation of application No. 15/885,092, filed on Jan. 31, 2018, now Pat. No. 10,192,325, which is a (Continued)

(30) Foreign Application Priority Data

Jul. 31, 2015 (CN) .......................... 2015 1 0465829

(51) Int. Cl.
*H04N 17/00* (2006.01)
*H04N 5/232* (2006.01)
(Continued)

(52) U.S. Cl.
CPC .................. G06T 7/80 (2017.01); G06T 7/00 (2013.01); H04N 5/23212 (2013.01);
(Continued)

(58) Field of Classification Search
CPC ............. G06T 2207/30208; G06T 7/00; G06T 7/0018; G06T 7/80; H04N 17/002;
(Continued)

(56) References Cited

U.S. PATENT DOCUMENTS

2014/0285676 A1 9/2014 Barreto et al.
2016/0005343 A1 1/2016 Lee et al.

FOREIGN PATENT DOCUMENTS

CN 101673397 A 3/2010
CN 101763632 A 6/2010
(Continued)

OTHER PUBLICATIONS

The World Intellectual Property Organization (WIPO) International Search Report and Written Opinion for PCT/CN2016/079377 dated Jun. 30, 2016 9 Pages.

*Primary Examiner* — Sherrie Hsia
(74) *Attorney, Agent, or Firm* — Anova Law Group, PLLC

(57) ABSTRACT

A method for calibrating an imaging device includes calculating attitude information of the imaging device relative to a screen based at least in part on an image captured by the imaging device, generating a calibration signal based at least in part on the attitude information, displaying the calibration signal on the screen, and displaying a guiding signal on the screen.

20 Claims, 4 Drawing Sheets

Related U.S. Application Data continuation of application No. PCT/CN2016/079377, filed on Apr. 15, 2016.

(51) Int. Cl.
*G06T 7/80* (2017.01)
*G06T 7/00* (2017.01)

(52) U.S. Cl.
CPC ....... H04N 17/002 (2013.01); *G06T 2200/24* (2013.01); *G06T 2207/30208* (2013.01)

(58) Field of Classification Search
CPC .... H04N 17/00; H04N 17/02; H04N 5/23212; H04N 5/232
USPC ......... 348/187, 188, 180–182; 382/255, 274, 382/275
See application file for complete search history.

(56) References Cited

FOREIGN PATENT DOCUMENTS

| | | |
|---|---|---|
| CN | 101794448 A | 8/2010 |
| CN | 103838660 A | 6/2014 |
| CN | 104537661 A | 4/2015 |
| CN | 105096324 A | 11/2015 |
| JP | 2003065714 A | 3/2003 |

METHOD FOR CALIBRATING AN IMAGING DEVICE AND AN IMAGING DEVICE

CROSS-REFERENCE TO RELATED APPLICATIONS

This application is a continuation application of U.S. application Ser. No. 15/885,092, filed on Jan. 31, 2018, now U.S. Pat. No. 10,192,325, which is a continuation application of International Application No. PCT/CN2016/079377, filed on Apr. 15, 2016, which claims priority to Chinese Application No. 201510465829.3, filed on Jul. 31, 2015, entitled "A METHOD FOR CALIBRATING AN IMAGING DEVICE AND AN IMAGING DEVICE," the entire contents of all of which are incorporated herein by reference.

TECHNICAL FIELD

The disclosure relates to computer vision technology, and more particularly to a method for calibrating an imaging device and an imaging device.

BACKGROUND OF THE DISCLOSURE

An imaging device can be calibrated by appropriately placing a checkerboard in front of the imaging device and moving the checkerboard following a certain rule. A technician decides a direction of moving the checkerboard according to a theory, collects a certain number of images and calculates a precision of the calibration. The calibration is completed if an error falling within a certain range.

However, the existing imaging device calibration requires a certain level of theoretical knowledge from the technician. The technician moves the checkerboard based on his/her experience and theory, and an improper movement of the checkerboard can lead to a failure in calibration or an unacceptable precision. Therefore, an ordinary user having no related experience or theory may not perform the calibration process alone, and the user may have to spend extra time and effort in learning and practicing the imaging device calibration.

SUMMARY OF THE DISCLOSURE

The disclosure provides a method for calibrating an imaging device and an imaging device. A calibration signal and a guiding signal can be displayed on a screen in calibrating the imaging device, enabling a user having no related experience and theory to move the imaging device or the screen based upon the calibration signal and the guiding signal. Therefore, a difficulty in calibrating the imaging device can be reduced.

In view of the above, a first aspect of the disclosure provides a method for calibrating an imaging device. The method can comprise: calculating a first attitude information of the imaging device relative to a screen from a first set of images captured by the imaging device, each image in the first set of images comprising a checkerboard information which is entirely or partially displayed on the screen; generating a first calibration signal from the first attitude information, and displaying the first calibration signal on a checkerboard on the screen; and displaying a guiding signal on the screen, such that a user moves the imaging device or the screen in accordance with the guiding signal.

In connection with the first aspect of the disclosure, in a first embodiment of the first aspect of the disclosure, the method can further comprise, before displaying the guiding signal on the screen: generating the guiding signal based upon a predetermined strategy and/or the first attitude information.

In connection with the first embodiment of the first aspect of the disclosure, in a second embodiment of the first aspect of the disclosure, generating the guiding signal based upon the predetermined strategy and/or the first attitude information can comprise: obtaining a second attitude information based upon a preset calibration path and the first attitude information, and generating the guiding signal from the second attitude information.

In connection with the first embodiment of the first aspect of the disclosure, in a third embodiment of the first aspect of the disclosure, generating the guiding signal based upon the predetermined strategy and/or the first attitude information can comprise: generating a dynamic calibration path based upon a dynamic path generation rule and the first calibration signal, obtaining a second attitude information based upon the dynamic calibration path and the first attitude information, and generating the guiding signal from the second attitude information.

In connection with the first aspect of the disclosure, in a fourth embodiment of the first aspect of the disclosure, the method can further comprise, before calculating the first attitude information of the imaging device relative to the screen from the first set of images captured by the imaging device: capturing the first set of images from a camera pointing to the screen.

In connection with the first aspect of the disclosure, in a fifth embodiment of the first aspect of the disclosure, the method can further comprise, before generating the first calibration signal from the first attitude information: analyzing each image in the first set of images to extract corner point arrays; determining whether the first set of images satisfy a calibration requirement based upon each one of the corner point arrays; and saving the first set of images if the calibration requirement is satisfied, or deleting the first set of images if the calibration requirement is not satisfied.

In connection with the first aspect of the disclosure, in a sixth embodiment of the first aspect of the disclosure, generating the first calibration signal from the first attitude information and displaying the first calibration signal on the screen can comprise: analyzing the first attitude information to obtain an attitude data; generating the first calibration signal from the attitude data; and displaying the first calibration signal on the screen.

In connection with the first aspect of the disclosure, in a seventh embodiment of the first aspect of the disclosure, the method can further comprise, after displaying the guiding signal on the screen: when the user adjusts the imaging device in accordance with the guiding signal, calculating a third attitude information of the imaging device relative to the screen from a second set of images captured by the imaging device, generating a second calibration signal from the third attitude information, and displaying the second calibration signal on the screen.

In connection with the first aspect of the disclosure, in an eighth embodiment of the first aspect of the disclosure, the method can further comprise, after displaying the guiding signal on the screen: when the user adjusts the imaging device in accordance with the guiding signal, calculating a third attitude information of the imaging device relative to the screen from a second set of images captured by the imaging device, generating a second calibration signal from the third attitude information, and displaying the second calibration signal on the screen; and generating a new guiding signal from the second set of images or the third attitude information.

In connection with the first aspect of the disclosure, as well as the first, second, third, fourth, fifth, sixth, seventh or eighth embodiment of the first aspect of the disclosure, in a ninth embodiment of the first aspect of the disclosure, the first set of images can be images for calibration containing the checkerboard.

In connection with the first aspect of the disclosure, as well as the first, second, third, fourth, fifth, sixth, seventh or eighth embodiment of the first aspect of the disclosure, in a tenth embodiment of the first aspect of the disclosure, the imaging device can be a monocular camera, a binocular camera or a multocular camera. The monocular camera can be calibrated using one image, the binocular camera can be calibrated using two images, and the multocular camera can be calibrated using a plurality of images.

In connection with the first aspect of the disclosure, as well as the first, second, third, fourth, fifth, sixth, seventh or eighth embodiment of the first aspect of the disclosure, in an eleventh embodiment of the first aspect of the disclosure, the first attitude information can comprise a position information of a first image and a distance information from the imaging device to the screen. The position information of the first image can comprise a position of a center of the monocular camera, the binocular camera or the multocular camera and respective positions of lenses of the binocular or multocular imaging device.

In connection with the eleventh embodiment of the first aspect of the disclosure, in a twelfth embodiment of the first aspect of the disclosure, the first guiding signal can be provided with a ring shape having a diameter corresponding to the distance information from the imaging device to the screen.

In connection with the eleventh embodiment of the first aspect of the disclosure, in a thirteenth embodiment of the first aspect of the disclosure, the first guiding signal can be provided with a shape including a dot, a crosshair, a polygon or a combination thereof.

In connection with the tenth embodiment of the first aspect of the disclosure, in a fourteenth embodiment of the first aspect of the disclosure, the method can further comprise: when the user moves the imaging device in accordance with the guiding signal, capturing a plurality of sets of images for calibration using the imaging device, and saving those sets of images among the plurality of sets of images for calibration satisfying a calibration requirement into a database; and stopping generating the guiding signal and calculating a calibration precision if the number of the images for calibration reaches a preset number.

A second aspect of the disclosure provides an imaging device. The imaging device can comprise an attitude information obtaining module configured to calculate a first attitude information of the imaging device relative to a screen from a first set of images captured by the imaging device, each image in the first set of images comprising a checkerboard information which is entirely or partially displayed on the screen; a calibration signal module configured to generate a first calibration signal from the first attitude information and display the first calibration signal on the screen; and a guiding signal module configured to display a guiding signal on the screen, such that a user moves the imaging device or the screen in accordance with the guiding signal.

In connection with the second aspect of the disclosure, in a first embodiment of the second aspect of the disclosure, the imaging device can further comprise a guiding signal generating module configured to generate the guiding signal based upon a predetermined strategy and/or the first attitude information.

In connection with the first embodiment of the second aspect of the disclosure, in a second embodiment of the second aspect of the disclosure, the guiding signal generating module can be configured to obtain a second attitude information based upon a preset calibration path and the first attitude information and generate the guiding signal from the second attitude information.

In connection with the first embodiment of the second aspect of the disclosure, in a third embodiment of the second aspect of the disclosure, the guiding signal generating module can be configured to generate a dynamic calibration path based upon a dynamic path generation rule and the first calibration signal, obtain a second attitude information based upon the dynamic calibration path and the first attitude information, and generate the guiding signal from the second attitude information.

In connection with the second aspect of the disclosure, in a fourth embodiment of the second aspect of the disclosure, the imaging device can further comprise an image capturing module configured to capture the first set of images from a camera pointing to the screen.

In connection with the second aspect of the disclosure, in a fifth embodiment of the second aspect of the disclosure, the imaging device can further comprise an image analyzing module configured to analyze each image in the first set of images to extract corner point arrays; determine whether the first set of images satisfy a calibration requirement based upon each one of the corner point arrays; and save the first set of images if the first set of images satisfy the calibration requirement, or delete the first set of images if the first set of images do not satisfy the calibration requirement.

In connection with the second aspect of the disclosure, in a sixth embodiment of the second aspect of the disclosure, the calibration signal module can be configured to analyze the first attitude information to obtain an attitude data; generate a first calibration signal from the attitude data; and display the first calibration signal on the screen.

In connection with the second aspect of the disclosure, in a seventh embodiment of the second aspect of the disclosure, the calibration signal module can be further configured to, when the user adjusts the imaging device in accordance with the guiding signal, calculate a third attitude information of the imaging device relative to the screen from a second set of images captured by the imaging device, generate a second calibration signal from the third attitude information, and display the second calibration signal on the screen.

In connection with the second aspect of the disclosure, in an eighth embodiment of the second aspect of the disclosure, the imaging device can further comprise a calibration adjustment module. The calibration signal module can be further configured to, when the user adjusts the imaging device in accordance with the guiding signal, calculate a third attitude information of the imaging device relative to the screen from a second set of images captured by the imaging device, generate a second calibration signal from the third attitude information, and display the second calibration signal on the screen. The calibration adjustment module can be configured to generate a new guiding signal from the second set of images or the third attitude information.

In connection with the second aspect of the disclosure, in a ninth embodiment of the second aspect of the disclosure, the imaging device can further comprise a calibration precision calculating module. The image capturing module can be further configured to, when the user moves the imaging device in accordance with the guiding signal, capture a plurality of sets of images for calibration using the imaging device, and save those sets of images among the plurality of sets of images satisfying a calibration requirement into a database. The calibration precision calculating module is configured to stop generating the guiding signal and calculate a calibration precision if the number of the images for calibration reaches a preset number.

It will be appreciated that, the technical solutions of the present disclosure are advantageous in various aspects. When a user is calibrating an imaging device, a first attitude information of the imaging device relative to a screen can be calculated from a first set of images captured by the imaging device, a first calibration signal can be generated from the first attitude information and displayed on a checkerboard on the screen, and a guiding signal can be displayed on the screen, such that the user can simply move the imaging device in accordance with the guiding signal. Therefore, a user having no related experience and theory can move a position of the imaging device or the screen in accordance with the calibration signal and the guiding signal, reducing a difficulty and improving an operability in calibrating the imaging device.

BRIEF DESCRIPTION OF THE DRAWINGS

Technical solutions of embodiments of the disclosure and the prior art will be described with reference to the accompanying drawings. It will be apparent to those skilled in the art that, the drawings merely illustrate some embodiments of the disclosure, and various other drawings can be conceived without any inventive effort.

DETAILED DESCRIPTION OF THE DISCLOSURE

Embodiments of the disclosure provide a method and an apparatus for calibrating an imaging device. A calibration signal and a guiding signal can be displayed on a screen in calibrating the imaging device, enabling a user having no related experience and theory to move the imaging device or the screen based upon the calibration signal and the guiding signal, such that a difficulty in calibrating the imaging device can be reduced.

A better understanding of the disclosure will be obtained by reference to the following detailed description that sets forth illustrative embodiments with reference to the drawings. It will be apparent that, the embodiments described herein are merely provided by way of example. Those skilled in the art can conceive various embodiments in light of those disclosed herein without inventive efforts, and all these embodiments are within the scope of the disclosure.

A detailed description of the disclosure will be provided with reference to various embodiments.

Figure 1:
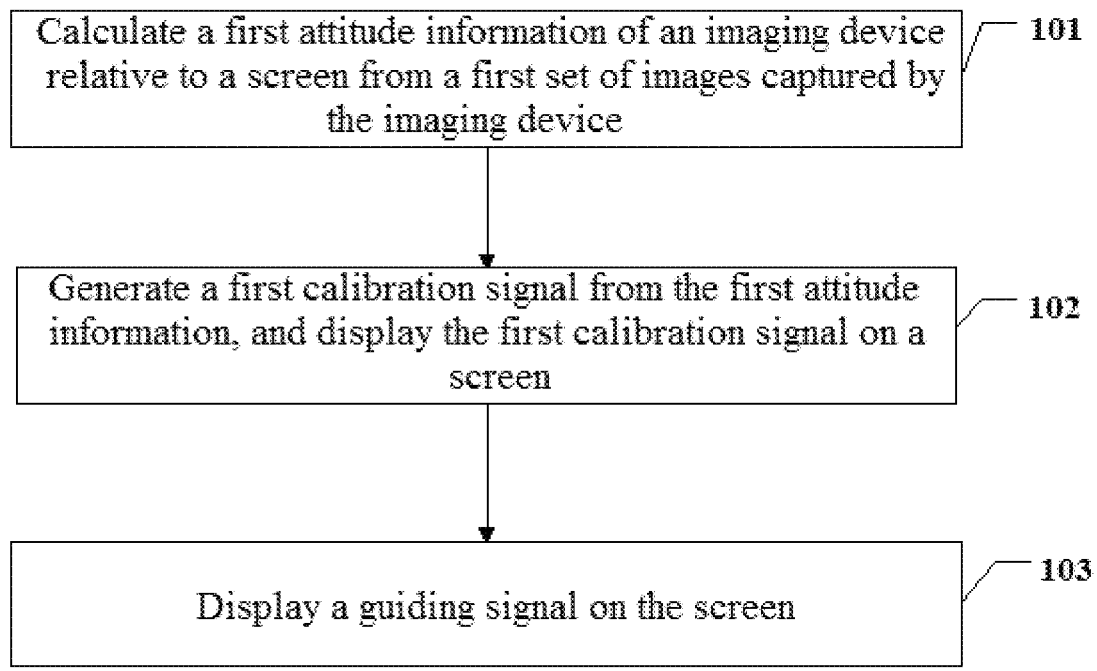
FIG. 1 is a schematic diagram of an example of a method for calibrating an imaging device in accordance with embodiments of the disclosure.

Referring to FIG. 1, embodiments of the disclosure provide a method for calibrating an imaging device. In some embodiments, the method can comprise steps 101 to 103.

In step 101, a first attitude information of the imaging device relative to a screen can be calculated from a first set of images captured by the imaging device.

In some embodiments of the disclosure, the first attitude information of the imaging device relative to the screen can be calculated from the first set of images captured by the imaging device while a user is calibrating the imaging device. Each image in the first set of images can comprise a checkerboard information which is entirely or partially displayed on the screen.

In step 102, a first calibration signal can be generated from the first attitude information, and the first calibration signal can be displayed on a checkerboard on the screen.

In some embodiments of the disclosure, the first calibration signal can be generated from the first attitude information and displayed on the checkerboard on the screen, such that the user can learn a current attitude of the imaging device.

In step 103, a guiding signal can be displayed on the screen.

In some embodiments of the disclosure, the guiding signal can be displayed on the screen, such that the user can move the imaging device or the screen in accordance with the guiding signal.

In some embodiments of the disclosure, when the user is calibrating the imaging device, the first attitude information of the imaging device relative to the screen can be calculated from the first set of images captured by the imaging device. The first calibration signal can be generated from the first attitude information and displayed on the checkerboard on the screen. The guiding signal in accordance within accordance with the guiding signal. Therefore, a user having no related experience and theory can move a position of the imaging device or the screen in accordance with the calibration signal and the guiding signal, reducing a difficulty and improving an operability in calibrating the imaging device.

In some embodiments of the disclosure, the method can further comprise, before displaying the guiding signal on the screen, generating the guiding signal based upon a predetermined strategy and/or the first attitude information.

In some embodiments of the disclosure, generating the guiding signal based upon the predetermined strategy and/or the first attitude information can comprise obtaining a second attitude information based upon a preset calibration path and the first attitude information, and generating the guiding signal from the second attitude information. Alternatively, generating the guiding signal based upon the predetermined strategy and/or the first attitude information can comprise generating a dynamic calibration path based upon a dynamic path generation rule and the first calibration signal, obtaining a second attitude information based upon the dynamic calibration path and the first attitude information, and generating the guiding signal from the second attitude information.

In the embodiments of the disclosure, the step of generating the guiding signal can be performed, such that the technical solution is more feasible.

In some embodiments of the disclosure, the method can further comprise, before calculating the first attitude information of the imaging device relative to the screen based upon the first set of images captured by the imaging device, capturing the first set of images using a camera pointing to the screen.

In the embodiments of the disclosure, the step of obtaining the first set of images can be performed, such that the technical solution is more complete.

In some embodiments of the disclosure, the method can further comprise, before generating the first calibration signal based upon the first attitude information, analyzing each image in the first set of images to extract corner point arrays, determining whether the first set of images satisfy a calibration requirement based upon each one of the corner point arrays, saving the first set of images if the calibration requirement is satisfied or deleting the first set of images if the calibration requirement is not satisfied.

In the embodiments of the disclosure, a confirmation can be made as to whether the first set of images satisfy the calibration requirement. Therefore, resources wasted in processing incorrect images can be reduced.

In some embodiments of the disclosure, generating the calibration signal based upon the first attitude information and displaying the calibration signal on the screen can comprise analyzing the first attitude information to obtain an attitude data, generating the calibration signal from the attitude data, and displaying the calibration signal on the screen.

In the embodiments of the disclosure, the process of generating the calibration signal based upon the first attitude information can be refined, making the technical solution more complete.

In some embodiments of the disclosure, the method can further comprise, after displaying the guiding signal on the screen, when the user adjusts the imaging device in accordance with the guiding signal, calculating a third attitude information of the imaging device relative to the screen from a second set of images captured by the imaging device, generating a second calibration signal from the third attitude information, and displaying the second calibration signal on the screen. Alternatively, the method can further comprise, after displaying the guiding signal on the screen, when the user adjusts the imaging device in accordance with the guiding signal, calculating a third attitude information of the imaging device relative to the screen based upon a second set of images captured by the imaging device, generating a second calibration signal based upon the third attitude information, displaying the second calibration signal on the screen, and generating a new guiding signal from the second set of images or the third attitude information.

In the embodiments of the disclosure, two alternative operations can be performed based upon the captured second set of images after the user moves the imaging device in accordance with the guiding signal, making the technical solution more complete.

In some embodiments of the disclosure, the method can further comprise: when the user moves the imaging device in accordance with the guiding signal, capturing a plurality of sets of images for calibration using the imaging device, and saving those sets of images among the plurality of sets of images satisfying a calibration requirement into a database; and stopping generating the guiding signal and calculating a calibration precision if the number of the images for calibration reaches a preset number.

In the embodiments of the disclosure, the calibration precision can be calculated upon a completion of the calibration process to obtain, making the technical solution more complete.

In some embodiments of the disclosure, the first set of images can be images for calibration containing the checkerboard.

In some embodiments of the disclosure, the imaging device can comprise a monocular, a binocular or a multocular camera. The imaging device having a monocular camera can be calibrated using one image. The imaging device having a binocular camera can be calibrated using two images. The imaging device having a multocular camera can be calibrated using a plurality of images.

In some embodiments of the disclosure, the first attitude information can comprise a position information of the first set of images and a distance information from the imaging device to the screen. The position information of the first set of images can comprise a position of a center of the monocular camera, the binocular camera or the multocular camera and a respective position of the binocular camera or the multocular camera.

In some embodiments of the disclosure, the first guiding signal can be provided with a ring shape having a diameter corresponding to the distance information from the imaging device to the screen.

In some embodiments of the disclosure, the first guiding signal can be provided with a geometric shape including a dot, a crosshair, a polygon or a combination thereof.

The method for calibrating an imaging device in accordance with embodiments of the disclosure will be described in the context of a practical application scenario.

In some embodiments, the method for calibrating an imaging device can be applied in an imaging device calibration system. The imaging device calibration system can effect a human-computer interaction. The imaging device calibration system can comprise an imaging device and a computer.

Figure 2:
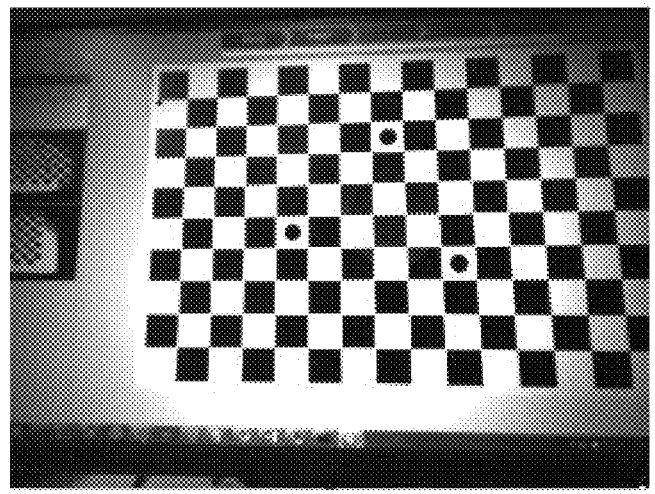
FIG. 2 is a schematic diagram of a checkerboard in accordance with embodiments of the disclosure.
Figure 3:
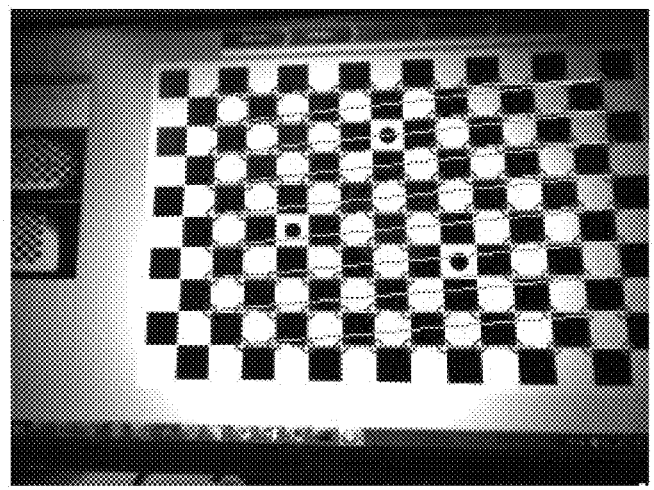
FIG. 3 is a schematic diagram of extracting corner point arrays from a checkerboard in accordance with embodiments of the disclosure.

Once the imaging device is connected with the computer, a checkerboard can be displayed on a screen of the computer, as shown in FIG. 2. A user can start the process of calibrating the imaging device by pointing the imaging device to the screen of the computer displaying a checkerboard. It will be appreciated that, the imaging device can be a monocular camera, a binocular camera or a multocular camera. The first set of images can comprise only one image if the imaging device is a monocular camera. The first set of images can comprise a plurality of images if the imaging device is a multocular camera, the number of the images being equal to the number of lenses of the multocular camera. In some embodiments, the first set of images as shown in FIG. 2 can be captured by the imaging device. The corner point arrays as shown in FIG. 3 can be extracted from the checkerboard in the first set of images. A determination can be made as to whether the first set of images satisfy a calibration requirement based upon the corner point arrays. The first set of images can be deleted if the calibration requirement is not satisfied; otherwise, the first set of images can be saved if the calibration requirement is satisfied. A current attitude of the imaging device relative to the checkerboard can be calculated (e.g., the first attitude information of the imaging device relative to the screen) by analyzing a PnP (Perspective-N-Point) problem. The first attitude information can comprise a position information of the first set of images and a distance information from the imaging device to the screen. In some instances, the position information of the first set of images can comprise a position information of the monocular camera, the binocular camera or the multocular camera, and a respective position information of the binocular or multocular camera. The first attitude information can be analyzed to obtain an attitude data, which attitude data comprising a data value of a central position of the first set of images on the screen and a distance value from the imaging device to the screen. In some embodiments, a first calibration signal A can be generated from the attitude data in a manner shown in FIG. 4. A central position of images captured by the imaging device (e.g., the central position of the first set of images on the screen) can be represented using a ring-shaped pattern shown by A in FIG. 4. A diameter of the ring-shaped pattern can correspond to the distance information from the imaging device to the screen. For instance, a larger radius of the ring can correspond to a smaller distance from the imaging device to the screen, and vice versa. It will be appreciated that, the calibration signal can be provided in various shapes in addition to a ring-shaped pattern, such as a dot, a crosshair, a polygon or a combination of various patterns. The first calibration signal, which represents a current attitude of the imaging device, can be highlighted on the checkerboard displayed on the screen of the computer using a red color or a flashing signal, such that the user can clearly observe the signal.

Figure 4:
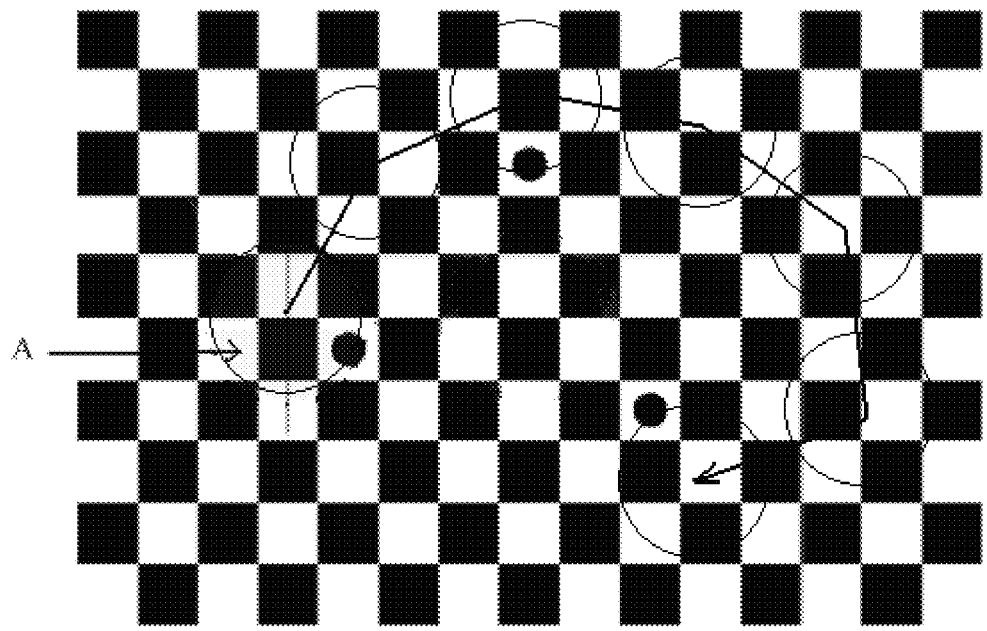
FIG. 4 is a schematic diagram of a calibration signal displayed on a screen in accordance with embodiments of the disclosure.

Once the first calibration signal is displayed on the screen, a guiding signal can be obtained from a predetermined strategy for imaging device calibration and the first attitude information, and the guiding signal can be displayed on the screen. In some instances, as shown in FIG. 4, the first calibration signal A can be positioned on a preset calibration path. A second attitude information can be obtained from the preset calibration path and the first attitude information, and the guiding signal can be generated from the second attitude information. Alternatively, a dynamic calibration path can be generated from a dynamic path generation rule and the first calibration signal A. A second attitude information can be obtained from the dynamic calibration path and the first attitude information, and the guiding signal can be generated from the second attitude information. It will be appreciated that, the preset calibration path and the dynamic calibration path can both satisfy a calibration rule and traverse the screen as much as possible in the calibration.

Figure 5:
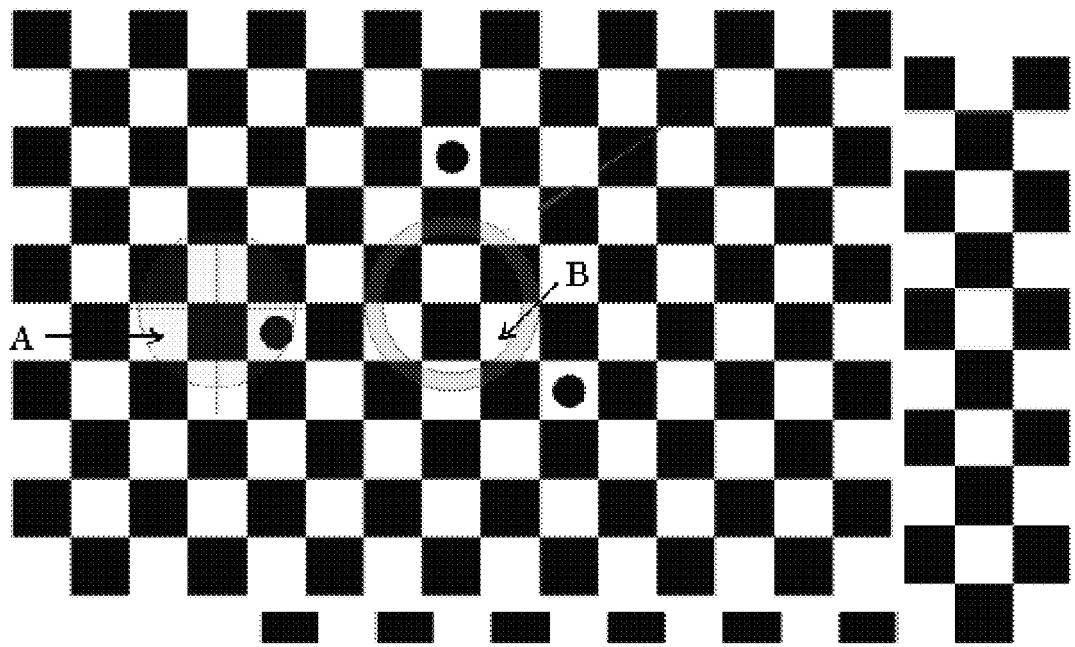
FIG. 5 is a schematic diagram of a calibration signal and a guiding signal displayed on a screen in accordance with embodiments of the disclosure.

The guiding signal (e.g., a guiding signal B shown in FIG. 5) can be generated as discussed hereinabove (e.g., with a method of graphically generating the first calibration signal) and displayed on the screen. In some instances, the guiding signal B can be provided in an annulus shape having an inner ring and an outer ring, a region between the inner and outer rings being an acceptable error range. The guiding signal B shown on the screen can indicate the next target position to which the user moves the imaging device.

Once the user moves the imaging device, a second set of images can be captured by the imaging device, a third attitude information of the imaging device relative to the screen can be calculated, and a second calibration signal can be generated from the third attitude information. The second calibration signal can be displayed on the screen. Optionally, a new guiding signal can be generated from the second set of images or the third attitude information after displaying the second calibration signal on the screen.

A plurality of sets of images for calibration can be captured by the imaging device when the imaging device is moved in accordance with the guiding signal along the preset calibration path or the dynamic calibration path. Those sets of images among the plurality of sets of images satisfying the calibration requirement can be saved into a database. No new guiding signal can be generated if the number of the stored images for calibration satisfies a calculation requirement. A calibration data can be calculated, and a calibration precision can be calculated from the calibration data. A determination can be made as to whether the imaging device calibration is acceptable based upon the calculated calibration precision.

Embodiments in which the imaging device being moved in calibrating the imaging device are discussed hereinabove. It will be appreciated that, the calibration can be implemented by moving the screen of the computer. The imaging device calibration can be effected with either approach.

The method for calibrating an imaging device in accordance with embodiments of the disclosure are described hereinabove. A description of an imaging device in accordance with embodiments of the disclosure will be provided. The imaging device can be used in an imaging device calibration system effecting a human-computer interaction. The system can comprise the imaging device and a computer.

Figure 6:
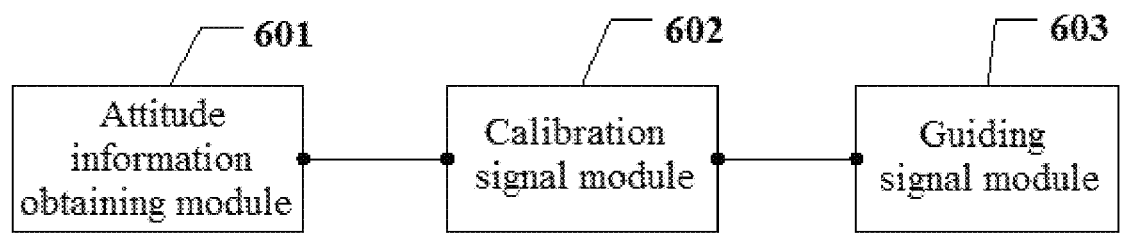
FIG. 6 is a schematic diagram of an example of an apparatus for calibrating an imaging device in accordance with embodiments of the disclosure.

Referring to FIG. 6, an example of the imaging device in accordance with embodiments of the disclosure can comprise an attitude information obtaining module 601, a calibration signal module 602 and a guiding signal module 603. The attitude information obtaining module 601 can be configured to calculate a first attitude information of the imaging device relative to a screen based upon a first set of images captured by the imaging device, each image in the first set of images comprising a checkerboard information which is entirely or partially displayed on the screen. The calibration signal module 602 can be configured to generate a first calibration signal from the first attitude information calculated by the attitude information obtaining module 601, and display the first calibration signal on a checkerboard on the screen. The guiding signal module 603 can be configured to display a guiding signal on the screen, such that a user can move the imaging device or the screen in accordance with the guiding signal.

In some embodiments of the disclosure, when the user is calibrating the imaging device, the attitude information obtaining module 601 can calculate the first attitude information of the imaging device relative to the screen from the first set of images captures by the imaging device. The calibration signal module 602 can generate the first calibration signal from the first attitude information and display the first calibration signal on the checkerboard on the screen. The guiding signal module 603 can display the guiding signal on the screen, such that the user can simply move the imaging device in accordance with the guiding signal. Therefore, a user having no related experience and theory can move a position of the imaging device or the screen in accordance with the calibration signal and the guiding signal, reducing a difficulty and improving an operability in calibrating the imaging device.

Figure 7:
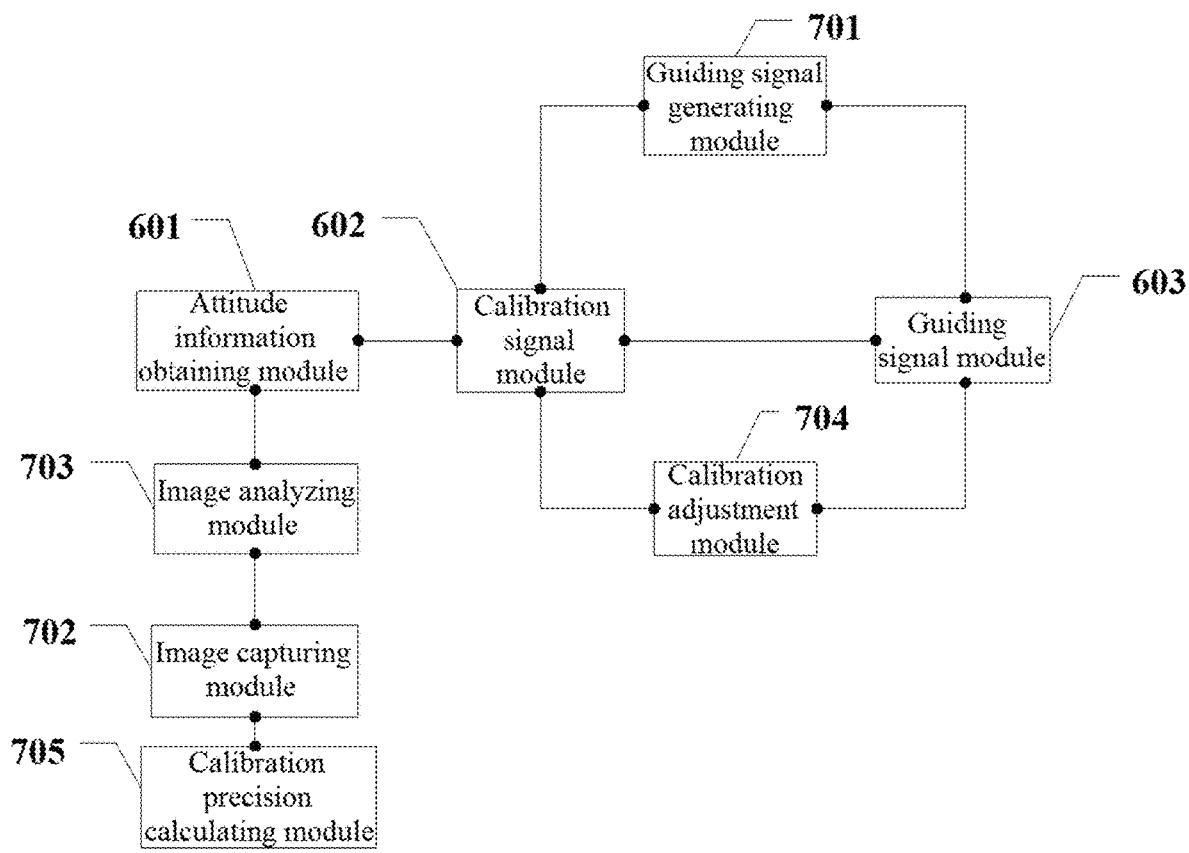
FIG. 7 is a schematic diagram of another example of an apparatus for calibrating an imaging device in accordance with embodiments of the disclosure.

As shown in FIG. 7, in some embodiments of the disclosure, the imaging device can further comprise a guiding signal generating module 701 configured to generate the guiding signal based upon a predetermined strategy and/or the first attitude information.

As shown in FIG. 7, in some embodiments of the disclosure, the guiding signal generating module 701 can be configured to obtain a second attitude information based upon a preset calibration path and the first attitude information, and generate the guiding signal from the second attitude information. Alternatively, the guiding signal generating module 701 can be configured to generate a dynamic calibration path based upon a dynamic path generation rule and the first calibration signal, obtain a second attitude information based upon the dynamic calibration path and the first attitude information, and generate the guiding signal from the second attitude information.

In the embodiments of the disclosure, the guiding signal generating module 701 can be added into the imaging device to generate the guiding signal, such that the technical solution is more feasible.

As shown in FIG. 7, in some embodiments of the disclosure, the imaging device can further comprise an image capturing module 702 configured to capture the first set of images using a camera pointing to the screen.

In the embodiments of the disclosure, the image capturing module 702 can be added into the imaging device to capture the first set of images, such that the technical solution is more complete.

As shown in FIG. 7, in some embodiments of the disclosure, the imaging device can further comprise an image analyzing module 703 configured to analyze each image in the first set of images to extract corner point arrays, determine whether the first set of images satisfy a calibration requirement based upon each one of the corner point arrays, save the first set of images if the first set of images satisfy the calibration requirement or delete the first set of images if the first set of images do not satisfy the calibration requirement.

In the embodiments of the disclosure, a confirmation can be made by the image analyzing module 703 as to whether the first of images satisfy the calibration requirement. Therefore, resources wasted in processing incorrect images can be reduced.

In some embodiments of the disclosure, the calibration signal module 602 can be configured to analyze the first attitude information to obtain an attitude data, generate the first calibration signal from the attitude data, and display the first calibration signal on the screen.

In the embodiments of the disclosure, the calibration signal can be generated by the calibration signal module 602 from the first attitude information, making the technical solution more complete.

In some embodiments of the disclosure, the calibration signal module 602 can be further configured to, when the user adjusts the imaging device in accordance with the guiding signal, calculate a third attitude information of the imaging device relative to the screen from a second set of images captured by the imaging device, generate a second calibration signal fromn the third attitude information, and display the second calibration signal on the screen.

As shown in FIG. 7, in some embodiments of the disclosure, the imaging device can further comprise a calibration adjustment module 704. The calibration signal module 602 can be further configured to, when the user adjusts the imaging device in accordance with the guiding signal, calculate a third attitude information of the imaging device relative to the screen from a second set of images captured by the imaging device, generate a second calibration signal from the third attitude information, and display the second calibration signal on the screen. The calibration adjustment module 704 can be configured to generate a new guiding signal from the second set of images or the third attitude information.

In the embodiments of the disclosure, the calibration adjustment module 704 can operate based upon the captured second set of images after the user movs the imaging device in accordance with the guiding signal, making the technical solution more complete.

As shown in FIG. 7, in some embodiments of the disclosure, the imaging device can further comprise a calibration precision calculating module 705 configured to, when the user moves the imaging device in accordance with the guiding signal, capture a plurality of sets of images for calibration using the imaging device, and save those sets of images among the plurality of sets of images satisfying a calibration requirement into a database; and stop generating the guiding signal and calculate a calibration precision when the number of the images for calibration reaches a preset number.

In the embodiments of the disclosure, the calibration precision can be calculated by the calibration precision calculating module 705 upon a completion of the calibration process, making the technical solution more complete.

An interaction between modules of the imaging device in accordance with embodiment of the disclosure will be described in the context of a practical application scenario.

In some embodiments, the imaging device calibration system can implement the method for calibrating an imaging device. The imaging device calibration system can effect a human-computer interaction. The imaging device calibration system can comprise an imaging device and a computer.

Once the imaging device is connected with the computer, a checkerboard can be displayed on a screen of the computer, as shown in FIG. 7. A user can start the process of calibrating the imaging device by pointing the imaging device to the screen of the computer displaying a checkerboard. It will be appreciated that, the imaging device can be a monocular camera, a binocular camera or a multocular camera. The first set of images can comprise only one image if the imaging device is a monocular camera. The first set of images can comprise a plurality of images if the imaging device is a multocular camera, the number of the images being equal to the number of lenses of the multocular camera. In some embodiments, the image capturing module 702 can obtain the first set of images as shown in FIG. 2. The image analyzing module 703 can extract the corner point arrays as shown in FIG. 3 from the checkerboard in the first set of images, and make a determination as to whether the first set of images satisfy a calibration requirement based on the corner point arrays. The image analyzing module 703 can delete the first set of images if the calibration requirement is not satisfied; otherwise, the image analyzing module 703 can save the first set of images if the calibration requirement is satisfied. The attitude information obtaining module 601 can calculate a current attitude of the imaging device relative to the checkerboard (e.g., the first attitude information of the imaging device relative to the screen) by analyzing a PnP (Perspective-N-Point) problem. The first attitude information can comprise a position information of the first set of images and a distance information from the imaging device to the screen. In some instances, the position information of the first set of images can comprise a position information of the monocular camera, the binocular camera or the multocular camera, and a respective position information of the binocular or multocular camera. The attitude information obtaining module 601 can analyze the first attitude information to obtain an attitude data, which attitude data comprising a data value of a central position of the first set of images on the screen and a distance value from the imaging device to the screen. In some embodiments, the calibration signal module 602 can generate a first calibration signal A from the attitude data in a manner as shown in FIG.

4. A central position of images captured by the imaging device (e.g., the central position of the first set of images on the screen) can be represented using a ring-shaped pattern shown by A in FIG. 4. A diameter of the ring-shaped pattern can correspond to the distance information from the imaging device to the screen. For instance, a larger radius of the ring can correspond to a smaller distance from the imaging device to the screen, and vice versa. It will be appreciated that, the calibration signal can be provided in various shapes in addition to a ring-shaped pattern, such as a dot, a crosshair, a polygon or a combination of various patterns. The first calibration signal, which represents a current attitude of the imaging device, can be highlighted on the checkerboard displayed on the screen of the computer using a red color or a flashing signal, such that the user can clearly observe the signal.

Once the first calibration signal is displayed on the screen, the guiding signal generating module 701 can obtain a guiding signal from a predetermined strategy for imaging device calibration and the first attitude information, and display the guiding signal on the screen. In some instances, as shown in FIG. 4, the first calibration signal A can be positioned on a preset calibration path. The guiding signal generating module 701 can obtain a second attitude information from the preset calibration path and the first attitude information, and generate the guiding signal from the second attitude information. Alternatively, the guiding signal generating module 701 can generate a dynamic calibration path based upon a dynamic path generation rule and the first calibration signal A, obtain a second attitude information from the dynamic calibration path and the first attitude information, and generate the guiding signal from the second attitude information. It will be appreciated that, the preset calibration path and the dynamic calibration path can both satisfy a calibration rule and traverse the screen as much as possible in the calibration.

The guiding signal (e.g., a guiding signal B shown in FIG. 5) can be generated as discussed hereinabove (e.g., with a method of graphically generating the first calibration signal) and displayed on the screen by the guiding signal module 603. In some instances, the guiding signal B can be provided in an annulus shape having an inner ring and an outer ring, a region between the inner and outer rings being an acceptable error range. The guiding signal B shown on the screen can indicate the next target position to which the user moves the imaging device.

Once the user movesthe imaging device, the image capturing module 702 can capture a second set of images, the attitude information obtaining module 601 can calculate a third attitude information of the imaging device relative to the screen, the calibration signal module can generate a second calibration signal from the third attitude information and display the second calibration signal on the screen. Optionally, the calibration adjustment module 704 can generate a new guiding signal from the second set of images or the third attitude information after displaying the second calibration signal on the screen.

A plurality of sets of images for calibration can be captured by the imaging device when the imaging device is moved in accordance with the guiding signal along the preset calibration path or the dynamic calibration path. Those sets of images among the multiple sets of images satisfying the calibration requirement can be saved into a database. The calibration precision module 705 can stop generating the guiding signal if the number of stored images for calibration satisfies a calculation requirement, calculate a calibration data, and calculate a calibration precision from the calibration data. A determination can be made as to whether the imaging device calibration is acceptable based upon the calculated calibration precision.

Embodiments in which the imaging device being moved in calibrating the imaging device are discussed hereinabove. It will be appreciated that, the calibration can be implemented by moving the screen of the computer. The imaging device calibration can be effected with either approach.

It will be apparent to those skilled in the art that, operations of systems, devices and units can be clear with reference to corresponding processes of the methods as described hereinabove.

It will be appreciated that, the system, device and method disclosed in embodiments of the disclosure can be implemented in other manners. For example, the described device embodiments are merely illustrative. For example, a division of units is merely a division based upon a logical function. Various divisions can be possible in actual implementation. For example, multiple units or components can be combined or integrated on another system. For example, some features can be ignored or not be performed. For example, a mutual coupling, a direct coupling or a communication connection as shown or discussed can be an indirect coupling or a communication connection via an interface, a means or an unit. The coupling can be an electrical coupling or a mechanical coupling.

The units illustrated as separate parts may or may not be physically separated. The parts shown as units may or may not be physical units. For example, the parts can be provided at the same location or distributed over a plurality of network units. All or part of the modules can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, the technical solution of the disclosure may be embodied as a software product. The computer software product is stored in a storage medium and includes several instructions for causing a computing device (which can be, e.g., a processor, a PC, a server, or a network device) to execute all or part of steps of the method according to the various embodiments of the present disclosure. The above mentioned storage medium includes: various media capable of storing program code, such as a U disk, a removable hard disk, ROM (read-only memory), RAM (random access memory), a diskette, an optical disk, etc.

The foregoing embodiments are intended to merely illustrate rather than limit the technical solution of the disclosure. While the disclosure has been illustrated with reference to the embodiments as described hereinabove, it will be obvious to those skilled in the art that variations may be made to the technical solutions disclosed by the embodiments or substitutions may be made to part of technical features. These variations or substitutions should by no means depart from the spirit and scope of the technical solutions of the embodiments of the disclosure.

What is claimed is:

1. A method for calibrating an imaging device comprising:

calculating attitude information of the imaging device relative to a screen based at least in part on an image captured by the imaging device;

generating a calibration signal based at least in part on the attitude information;

displaying the calibration signal on the screen; and displaying a guiding signal on the screen.

2. The method of claim 1, further comprising, before displaying the guiding signal on the screen:

generating the guiding signal based upon a predetermined strategy and/or the attitude information.

3. The method of claim 2, wherein:

the attitude information is first attitude information, and generating the guiding signal based upon the predetermined strategy and/or the attitude information comprises:

obtaining second attitude information based upon a preset calibration path and the first attitude information, and generating the guiding signal based at least in part on the second attitude information; or generating a dynamic calibration path based upon a dynamic path generation rule and the calibration signal, obtaining the second attitude information based upon the dynamic calibration path and the first attitude information, and generating the guiding signal based at least in part on the second attitude information.

4. The method of claim 1, further comprising, before generating the calibration signal:

analyzing the image to extract a corner point array; and determining that the image satisfies a calibration requirement based upon the corner point array.

5. The method of claim 1, wherein generating the calibration signal comprises:

analyzing the attitude information to obtain attitude data; and generating the calibration signal based at least in part on the attitude data.

6. The method of claim 1, wherein the image is a first image, the attitude information is first attitude information, and the calibration signal is a first calibration signal, the method further comprising, after displaying the guiding signal on the screen:

in response to the user adjusting the imaging device in accordance with the guiding signal, calculating second attitude information of the imaging device relative to the screen based at least in part on a second image captured by the imaging device;

generating a second calibration signal based at least in part on the second attitude information; and displaying the second calibration signal on the screen.

7. The method of claim 6, further comprising:

generating a new guiding signal based at least in part on the second image or the second attitude information; and displaying the new guiding signal on the screen.

8. The method of claim 1, wherein:

the image contains at least a portion of a checkerboard displayed on the screen, and displaying the calibration signal on the screen comprises displaying the calibration signal on the checkerboard on the screen.

9. The method of claim 1, wherein:

the attitude information comprises position information of the image and information of a distance from the imaging device to the screen, and the position information of the image comprises a position of a center of the imaging device.

10. The method of claim 1, wherein the guiding signal includes a ring shape having a diameter corresponding to a distance from the imaging device to the screen.

11. An imaging device comprising:

a processor; and a memory storing instructions that, when executed by the processor, cause the processor to:

calculate attitude information of the imaging device relative to a screen based at least in part on an image captured by the imaging device;

generate a calibration signal based at least in part on the attitude information;

display the calibration signal on the screen; and display a guiding signal on the screen.

12. The imaging device of claim 11, wherein the instructions further cause the processor to:

generate the guiding signal based upon a predetermined strategy and/or the attitude information.

13. The imaging device of claim 12, wherein:

the attitude information is first attitude information, and the instructions further cause the processor to:

obtain second attitude information based upon a preset calibration path and the first attitude information, and generate the guiding signal based at least in part on the second attitude information; or generate a dynamic calibration path based upon a dynamic path generation rule and the calibration signal, obtain the second attitude information based upon the dynamic calibration path and the first attitude information, and generate the guiding signal based at least in part on the second attitude information.

14. The imaging device of claim 11, wherein the instructions further cause the processor to:

analyze the image to extract a corner point array;

determine that the image satisfies a calibration requirement based upon the corner point array.

15. The imaging device of claim 11, wherein the instructions further cause the processor to:

analyze the attitude information to obtain attitude data; and generate the calibration signal based at least in part on the attitude data.

16. The imaging device of claim 11, wherein:

the image is a first image, the attitude information is first attitude information, and the calibration signal is a first calibration signal, and the instructions further cause the processor to, after displaying the guiding signal on the screen:

in response to the user adjusting the imaging device in accordance with the guiding signal, calculate second attitude information of the imaging device relative to the screen based at least in part on a second image captured by the imaging device;

generate a second calibration signal based at least in part on the second attitude information; and display the second calibration signal on the screen.

17. The imaging device of claim 16, wherein the instructions further cause the processor to:

generate a new guiding signal based at least in part on the second image or the second attitude information, and display the new guiding signal on the screen.

18. The imaging device of claim 11, wherein:

the image contains at least a portion of a checkerboard displayed on the screen, and the instructions further cause the processor to display the calibration signal on the checkerboard on the screen.

19. The imaging device of claim 11, wherein:
the attitude information comprises position information of the image and information of a distance from the imaging device to the screen, and
the position information of the image comprises a position of a center of the imaging device.

20. The imaging device of claim 11, wherein the guiding signal includes a ring shape having a diameter corresponding to a distance from the imaging device to the screen.

* * * * *